(12) United States Patent
Rito et al.

(10) Patent No.: US 8,105,073 B2
(45) Date of Patent: Jan. 31, 2012

(54) RETRACT MECHANISM FOR INJECTION BLOW MOLDING

(75) Inventors: Joseph A. Rito, Annandale, NJ (US); Bruce Temple, Fords, NJ (US)

(73) Assignee: Sterling Precision, Garner, NC (US)

( * ) Notice: Subject to any disclaimer, the term of this patent is extended or adjusted under 35 U.S.C. 154(b) by 278 days.

(21) Appl. No.: 12/322,335

(22) Filed: Jan. 30, 2009

(65) Prior Publication Data
US 2010/0072646 A1   Mar. 25, 2010

Related U.S. Application Data

(60) Provisional application No. 61/063,812, filed on Feb. 6, 2008.

(51) Int. Cl.
*B29C 49/30* (2006.01)
*B28B 7/28* (2006.01)
(52) U.S. Cl. .................................. 425/537; 264/334
(58) Field of Classification Search ............. 425/522, 425/537, 438, 441; 264/318, 334
See application file for complete search history.

(56) References Cited

U.S. PATENT DOCUMENTS

| | | | | |
|---|---|---|---|---|
| 3,856,450 A * | 12/1974 | Britten | | 425/398 |
| 4,362,291 A * | 12/1982 | Fuke et al. | | 249/144 |
| 4,419,323 A * | 12/1983 | Winchell | | 264/523 |
| 7,387,505 B1 * | 6/2008 | Chen et al. | | 425/190 |
| 7,677,878 B2 * | 3/2010 | Chen et al. | | 425/190 |
| 2004/0137104 A1 * | 7/2004 | Lu | | 425/438 |
| 2004/0156943 A1 * | 8/2004 | Lefebure | | 425/541 |
| 2008/0044603 A1 * | 2/2008 | Hutchinson et al. | | 428/35.7 |
| 2008/0124425 A1 * | 5/2008 | Chen et al. | | 425/545 |
| 2008/0236221 A1 * | 10/2008 | Chen et al. | | 70/266 |

* cited by examiner

*Primary Examiner* — Joseph Del Sole
*Assistant Examiner* — Kimberly A Stewart
(74) *Attorney, Agent, or Firm* — Lerner, David, Littenberg, Krumholz & Mentlik, LLP

(57) ABSTRACT

A bottom plug retract mechanism for use in a blow mold having a top die and a bottom die defining at least a portion of a mold cavity, the mechanism including a plug that is operable to move away from the mold cavity at an angle to the parting plane when the mold cavity is opened.

15 Claims, 16 Drawing Sheets

RETRACT MECHANISM FOR INJECTION BLOW MOLDING

CROSS-REFERENCE TO RELATED APPLICATIONS

This application claims the benefit of the filing date of U.S. Provisional Patent Application No. 61/063,812 filed Feb. 6, 2008, the disclosure of which is hereby incorporated herein by reference.

FIELD OF THE INVENTION

The present invention relates to a bottom plug retract mechanism for injection blow molding. More particularly, the present invention relates to a bottom plug retract mechanism guided by a slide mechanism that moves the bottom plug away from the mold cavity at an angle to the parting plane of the mold cavity.

BACKGROUND OF THE INVENTION

Blow molded plastic containers, such as pill bottles or beverage containers, are typically formed with recessed bottoms to provide increased structural stability. To produce such a recess, a "plug" is introduced in the bottom of the mold cavity so that as the parison stretches during the course of the blow cycle to meet the confines of the mold cavity, the bottom of the container forms around the protruding plug to conform to its shape. Subsequent to the blow cycle, in order to effect the removal of the container from the mold cavity, it is necessary to move the bottom plug away from the bottom of the container.

Typical injection blow molding machines have an upper and a lower die set. Typically, the lower die set is mounted to a machine bed, and the upper die set is configured to reciprocate vertically toward and away from the stationary lower die set. Mating blow mold halves are generally carried on the die sets to form closed blow mold cavities when the upper and lower die sets are pressed together. The cavities open when the upper die set is raised. A corresponding number of bottom plugs are arranged side-by-side and configured to align with the mold cavities.

It is known in the art to attach each bottom plug to a wedge, thereby creating a bottom plug assembly. Each wedge is provided with a pair of biased springs and corresponding guide pins. The biased springs of the prior art pushes the bottom plug assembly away from the mold cavity in a direction horizontal to the parting plane of the mold cavity and into a retracted position. The guide pins guide the movement of the bottom plug assembly as it enters into and retracts from the lower die set. The biased springs and guide pins are connected to the front of the wedge below the position of the bottom plug at one end, and to the lower die set at the other end. The lower die set typically includes holes for receiving the guide pins.

In order to push the bottom plug into the die set from its retracted position, an angled surface on the top rear surface of the wedge contacts a corresponding angled surface on the upper die set as the latter is lowered. The downward motion of the upper die set transmits a force through the angled surfaces and into the wedge. A portion of this force is directed horizontally, opposing the bias of the springs and pushing the bottom plug into the mold cavity. In this way each bottom plug is shifted horizontally into and out of its respective cavity as the upper die set is closed and then opened.

One problem with the prior art arises from the wear that occurs at the interface of the guide pins and the lower die set. That is, the upper die set exerts a vertical force at the top of the wedge, while the position of the guide pins is away from the top of the wedge, thereby creating a moment about the interface between the guide pins and the lower die set. As the guide pins resist the rotational force created by the moment, great stress is concentrated at the points of contact between the guide pins and the corresponding holes of the lower die set. After repeated cycles of advancing and retracting the bottom plug assembly, this stress will ultimately cause galling between the guide pins and the lower die set, thereby causing the pins to loosen with respect to the lower die set. The consequence is that the surfaces of the bottom plug and the mold cavity come into abrasive contact, ultimately destroying the integrity of one or both components. The present invention provides a bottom plug retract mechanism that overcomes the problems of the prior art.

SUMMARY OF THE INVENTION

One aspect of the invention is the direction of movement of the bottom plug upon retraction. Upon retraction, the bottom plug moves at an angle relative to the parting plane between the upper and lower die sets such that the plug moves away from the parting plane in a direction vertical to and away from the parting plane, and in a direction horizontal to the parting plane and away from the mold cavity. By moving the bottom plug assembly at an angle with respect to the mold cavity, abrasive contact between the surfaces of the bottom plug assembly and the surfaces of the lower die set is eliminated or reduced. Thus, the angled movement of the plug protects the surfaces of the bottom plug assembly, the mold cavity, and the lower die set from damaging wear.

A second aspect of this invention is the incorporation of a slide mechanism that guides movement of the bottom plug assembly with respect to the blow mold. As mentioned above, the slide mechanism is angled relative to the parting plane of the mold cavity providing the ability for the bottom plug assembly to move away from the mold cavity at an angle as it retracts. In addition, the angled orientation of the slide mechanism reduces the force that is applied perpendicular thereto as a result of the downward motion of the upper die set. This reduction in force means that the cam bearing surfaces of the slide mechanism will wear at a slower rate.

A third aspect of the present invention is ease of repair and maintenance. Components that may be susceptible to wear are the elements of the sliding mechanism. One or both of these components are attached to the bottom plug assembly or the wedge base with two fasteners and can be easily removed and replaced.

A fourth aspect of the invention is its ability to be easily added, or retrofit, to existing molds. By removing the retract mechanism of an existing mold, which usually consists of one single block or wedge, and inserting in place thereof the wedge base and bottom plug assembly of the present invention, any existing mold can be used with the invention. Because maintenance and repair of the present invention is cost effective and easy, such an upgrade could provide a cost effective alternative to repairing other retract mechanisms currently in use or on the market today.

One aspect of the invention provides a bottom plug retract mechanism for use in a blow mold having a top die and a bottom die defining at least a portion of a mold cavity, the mechanism including a plug that is operable to move away from the mold cavity at an angle to the parting plane when the mold cavity is opened. In addition, the angle at which the plug moves away from the mold cavity is about 5 degrees.

A further embodiment of the present invention provides a bottom plug retract mechanism for injection blow molding including a plug portion configured to align with a mold cavity during a blow molding operation. The embodiment may further include a wedge portion having a first end, a second end opposite the first end, a top, and a bottom, wherein the first end is attached to the plug portion and defines at least one recess. In addition, the bottom plug retract mechanism may include a slide mechanism having a first portion and a second portion, wherein either the first portion or the second portion is attached to the bottom of the wedge portion and the other of the first or the second portion is configured to slideably engage therewith, and wherein the slide mechanism is oriented at an angle relative to the parting plane of the mold cavity. In one embodiment, the bottom plug retract mechanism may further include at least one biased retractor mechanism operatively engaged with the at least one recess and configured to provide a force on the bottom plug retract mechanism away from the mold cavity, wherein the bottom plug retract mechanism moves away from the mold cavity along a path determined by the slide mechanism.

In another embodiment, the path along which the bottom plug retract mechanism moves is arranged so that when the bottom plug retract mechanism is remote from the mold cavity, there is a gap between surfaces of the plug and surfaces defining the mold cavity. In addition, the gap between the surfaces of the plug and the surfaces of the mold cavity may be large enough to prevent contact therebetween, but small enough to prevent the entry of foreign objects therein. Furthermore, the angle of the slide mechanism relative to the parting plane of the mold cavity may be about 5 degrees.

The at least one biased retractor mechanism may also include at least one spring and the slide mechanism may be a dove-tailed slide. In addition, the first portion of the slide mechanism may be a female portion and the second portion of the slide mechanism may be a male portion. Furthermore, the bottom plug retract mechanism may further comprise an end stop arranged to engage the second end of the wedge portion, thereby limiting movement thereof away from the mold cavity when the wedge portion is in a retracted position, as well as upper and lower mold halves, wherein the first or second portion of the slide mechanism is attached to the lower mold half. The first and second portions of the slide mechanism may be releasably attached to the wedge portion and the lower mold half of the bottom plug retract mechanism with fasteners.

In yet another embodiment, the first portion of the slide mechanism may be composed of a self-lubricating metal, such as alumina-bronze, and the second portion of the slide mechanism may be composed of a harder material, such as hardened steel. Additionally, a part of the second end of the wedge portion may be angled forward toward the first end thereof and a surface of the upper mold half may be configured to engage the angled part of the second end of the wedge portion such that when the upper mold half is lowered against the wedge portion, the wedge portion is advanced toward the mold cavity.

A further aspect of the invention provides a method of introducing a retracting a plug from a blow mold cavity using the bottom plug retract mechanism of the present technology. The method includes contacting a bottom plug retract mechanism with an upper mold half, the upper mold half configured to push the bottom plug retract mechanism in a generally forward and downward direction as dictated by the orientation of a slide mechanism, and lowering the upper mold half until it engages a lower mold half, with the plug of the wedge portion of the bottom plug retract mechanism positioned in the mold cavity. The method further includes raising the upper mold half to release the downward and forward forces acting on bottom plug retract mechanism, thereby allowing the biased retractor means to push the bottom plug retract mechanism upward and backward from the mold cavity, thereby removing the plug from the mold cavity without wearing the surfaces of the plug or the cavity.

BRIEF DESCRIPTION OF THE DRAWINGS

A more complete appreciation of the subject matter of the present invention and the various advantages thereof can be realized by reference to the following detailed description in which reference is made to the accompanying drawings in which.

DETAILED DESCRIPTION OF THE DRAWINGS

Figure 1:
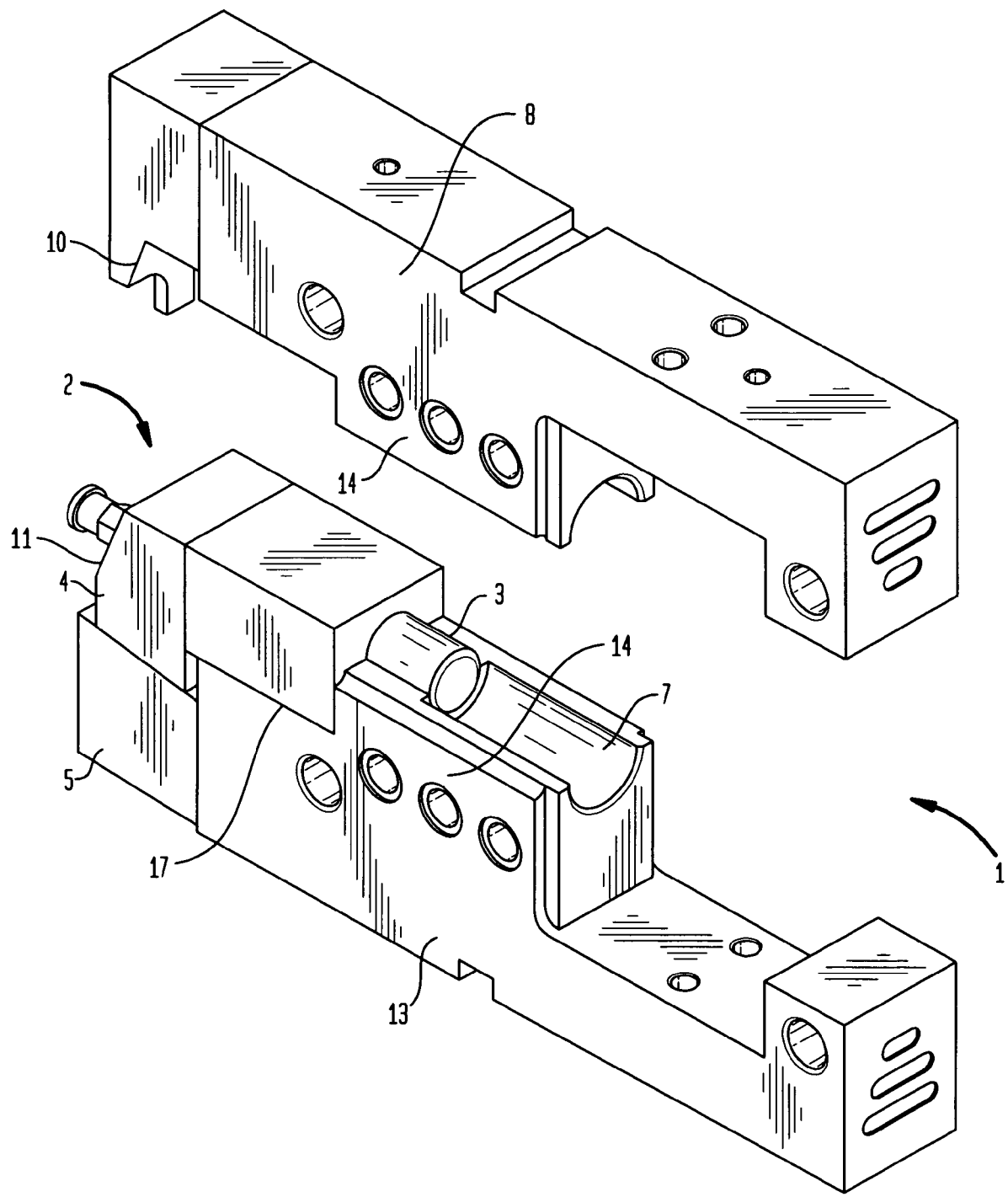
FIG. 1 is an isometric view of a blow mold having a bottom plug assembly inserted therein with the top die set raised.
Figure 5:
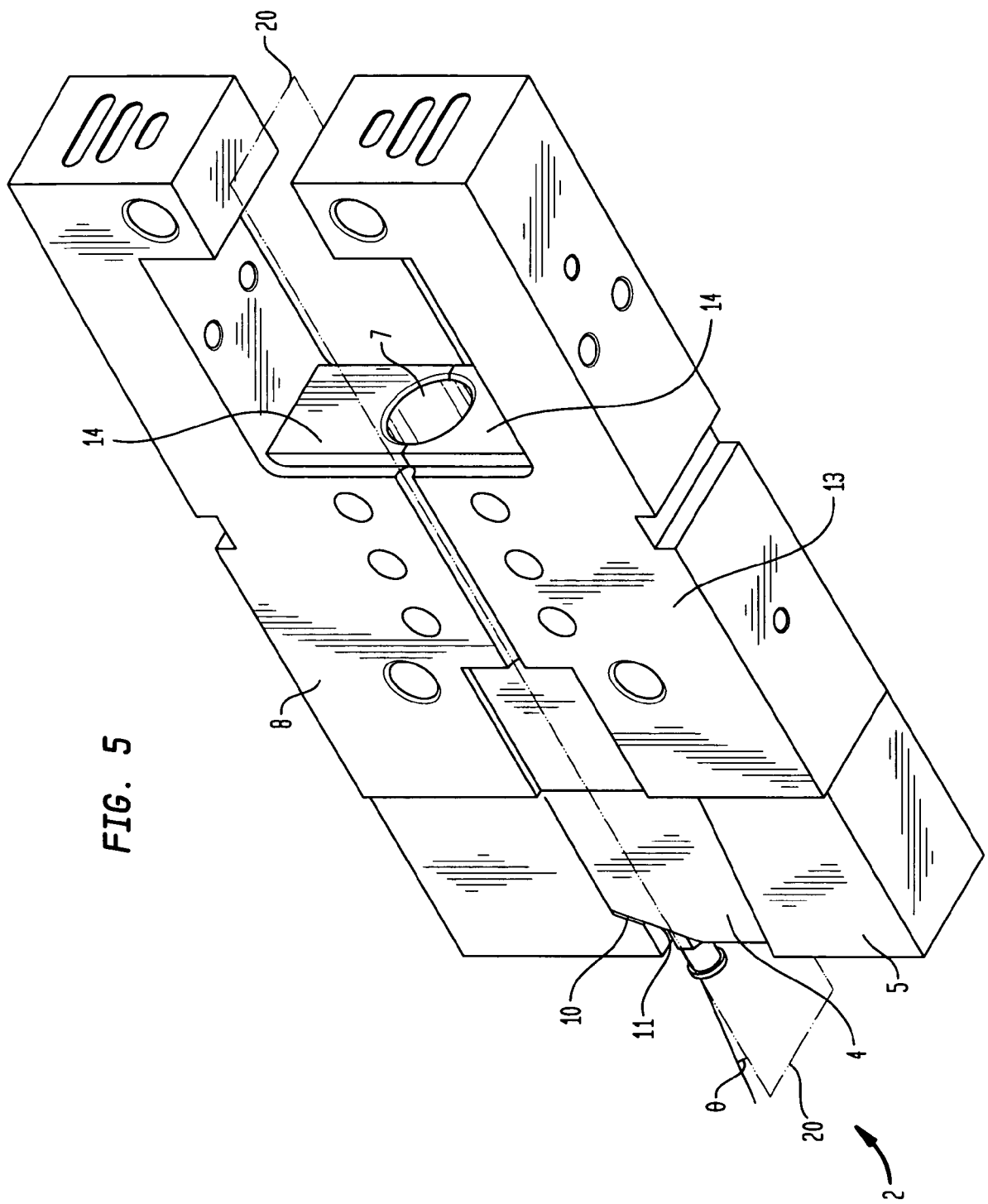
FIGS. 5-11 are perspective views of the blow mold and bottom plug assembly of FIG. 1 with the top die set lowered into position on the bottom die set.

Referring now to the drawings wherein like reference numerals indicate similar features, there is shown in FIG. 1 an isometric view of a blow mold 1 having a bottom plug assembly 2 inserted therein with the top die set 8 raised. Bottom plug 3 may be attached to wedge 4, the combination of which makes up bottom plug assembly 2. Bottom plug assembly 2 may move relative to a wedge base 5 by sliding on a sliding mechanism 6 (shown in FIG. 2) having a male and a female part. Sliding mechanism 6 may be angled relative to the a parting plane 20 (shown in FIG. 5) of corresponding mold cavity 7, thereby guiding bottom plug assembly 2 up and away from mold cavity 7 at an angle Ø (shown in FIG. 5) during retraction of the bottom plug assembly 2. The motion of bottom plug assembly 2 up and away from the mold cavity may create a gap 17 between the surfaces of bottom plug 3 and mold cavity 7, and between bottom plug 3 and bottom die set 13. This gap may preferably be large enough to prevent contact between the surfaces of the components, but small enough to prevent the entry of foreign objects or debris between bottom plug assembly 2 and mold cavity 7, or between bottom plug assembly 2 and bottom die set 13. Sliding mechanism 6 may preferably be angled at an angle of 5 degrees relative to the parting plane.

Figure 13:
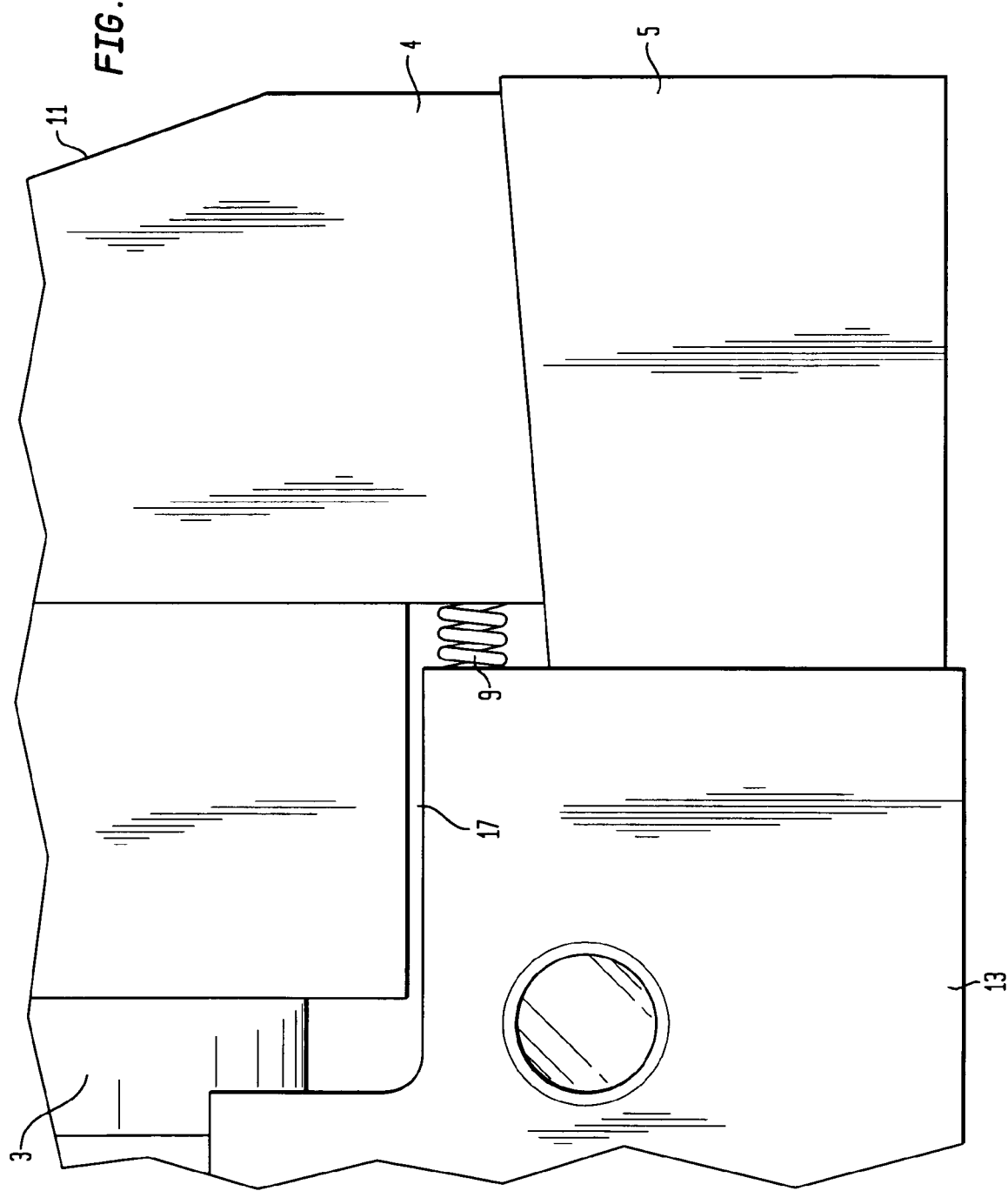
FIGS. 13-16 are perspective views of the biasing springs in conjunction with components of an embodiment.

In a preferred embodiment, when top die set 8 is in a raised position, as shown in FIG. 1, a pair of biasing springs 9 (shown in FIG. 13) may push bottom plug assembly 2 away from mold cavity 7 and into a retracted position. As top die set 8 is lowered, angled surface 10 of top die set 8 may come into contact with corresponding angled surface 11 of bottom plug assembly 2 and exert a force on bottom plug assembly 2. At least a portion of that force opposes biased springs 9, thereby compressing biasing springs 9, and pushing bottom plug assembly 2 forward and downward as guided by sliding mechanism 6. Consequently, bottom plug 3 may be pushed into the bottom of mold cavity 7. When the top die set 8 is raised, the force opposing biased springs 9 is relieved and bottom plug assembly 2 may again be pushed up and away from mold cavity 7 to a retracted position.

Figure 2:
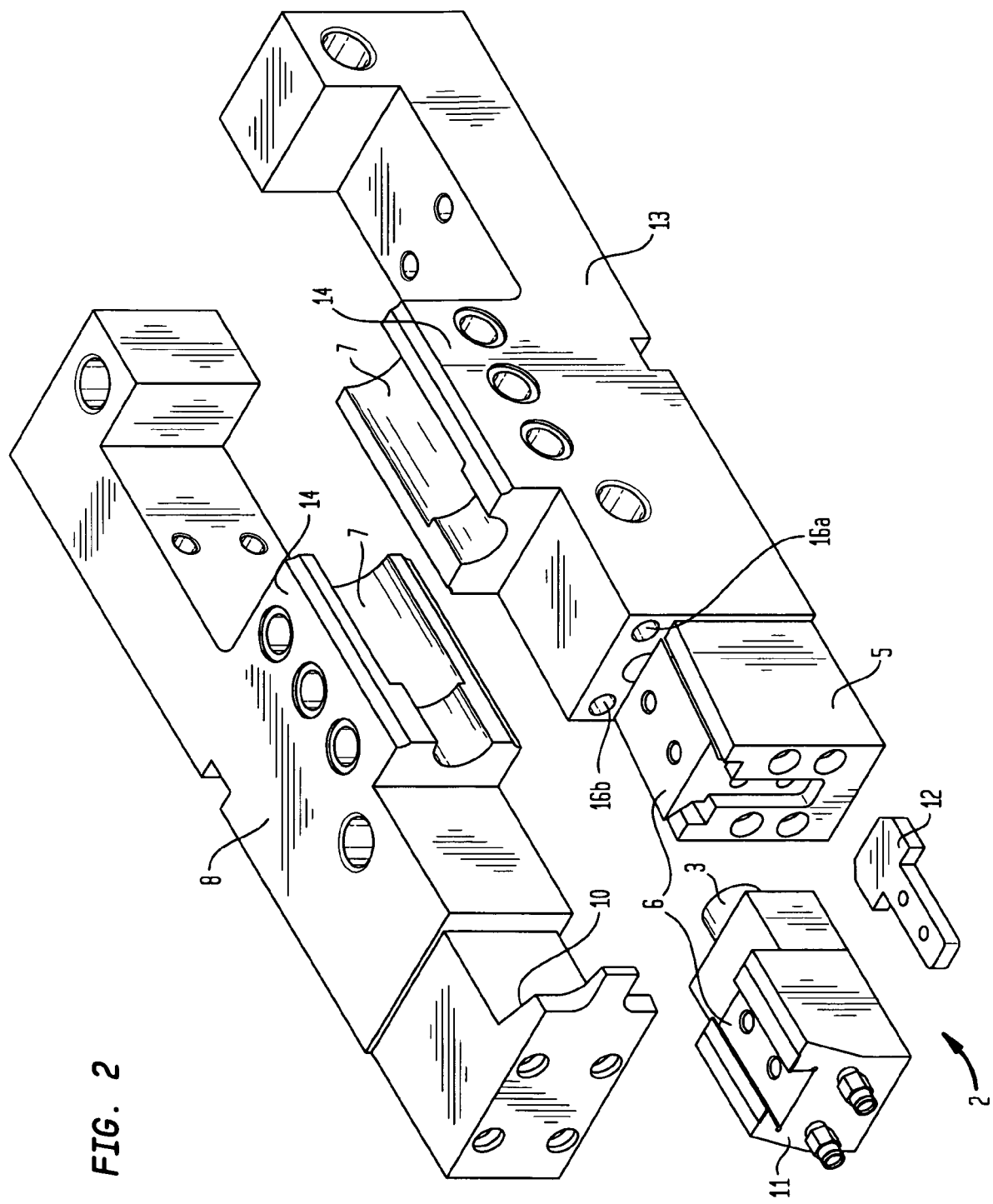
FIG. 2 is an isometric view of a blow mold and corresponding bottom plug assembly in a disassembled state.
Figure 6:
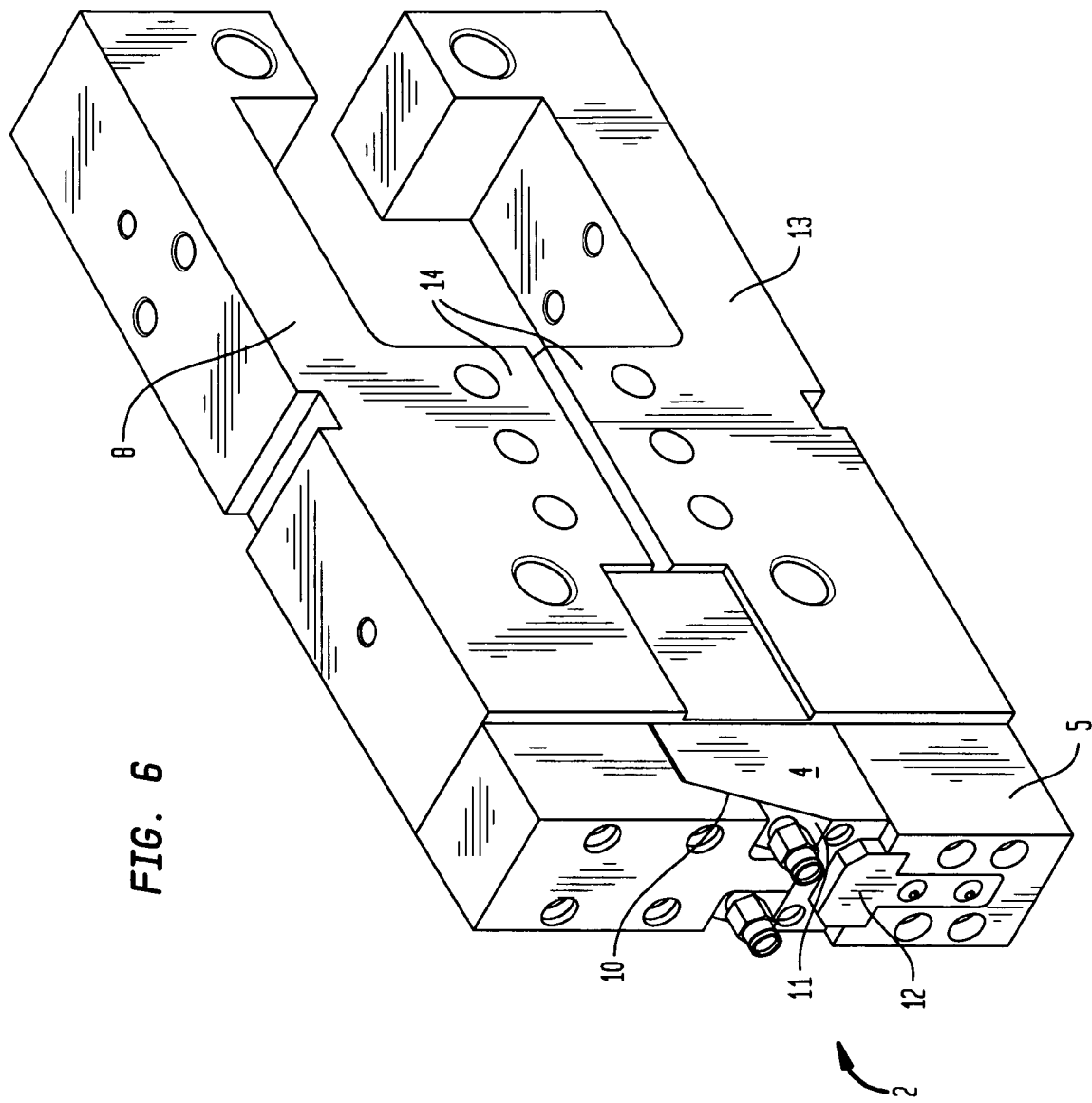
Figure 7:
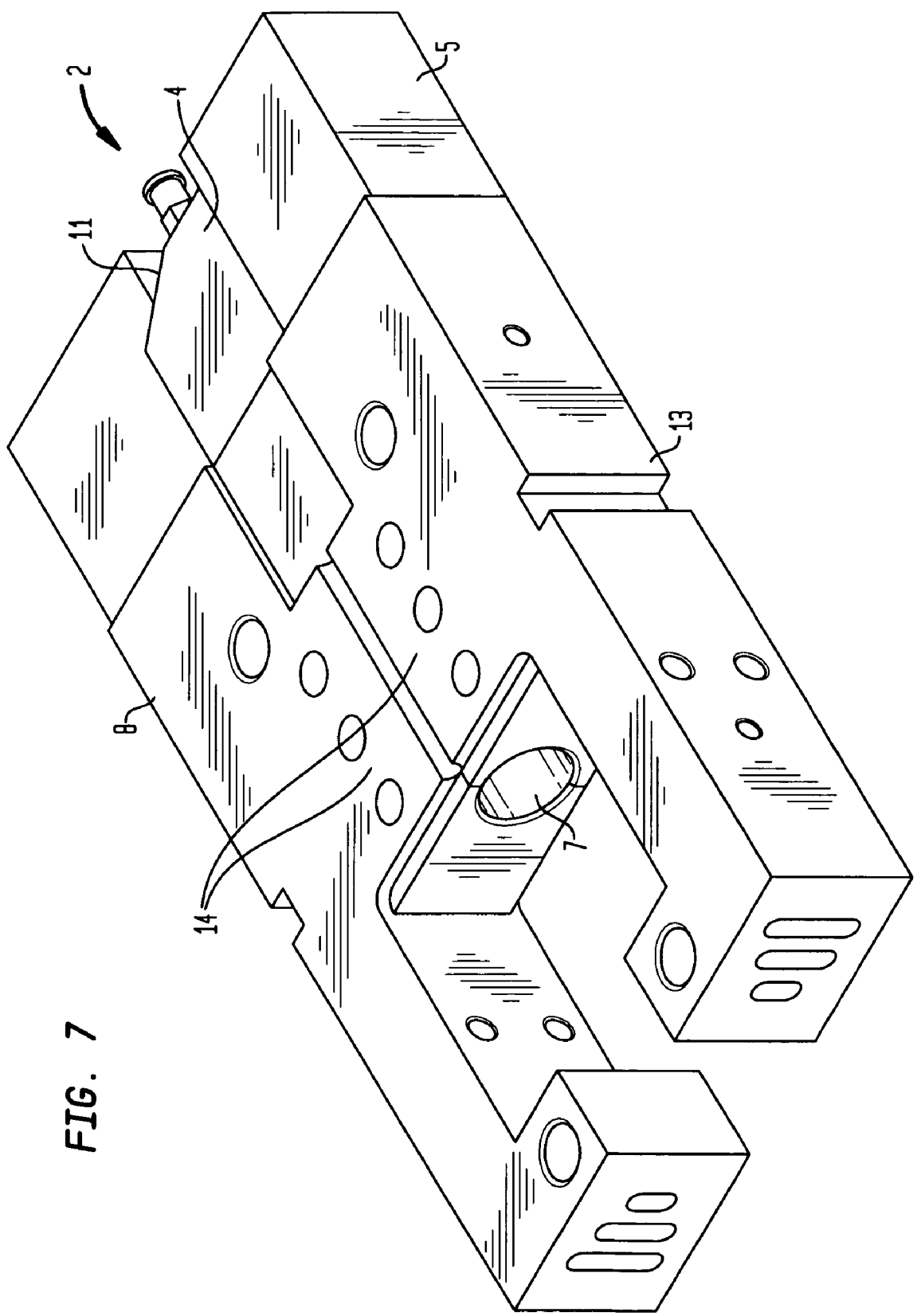
Figure 8:
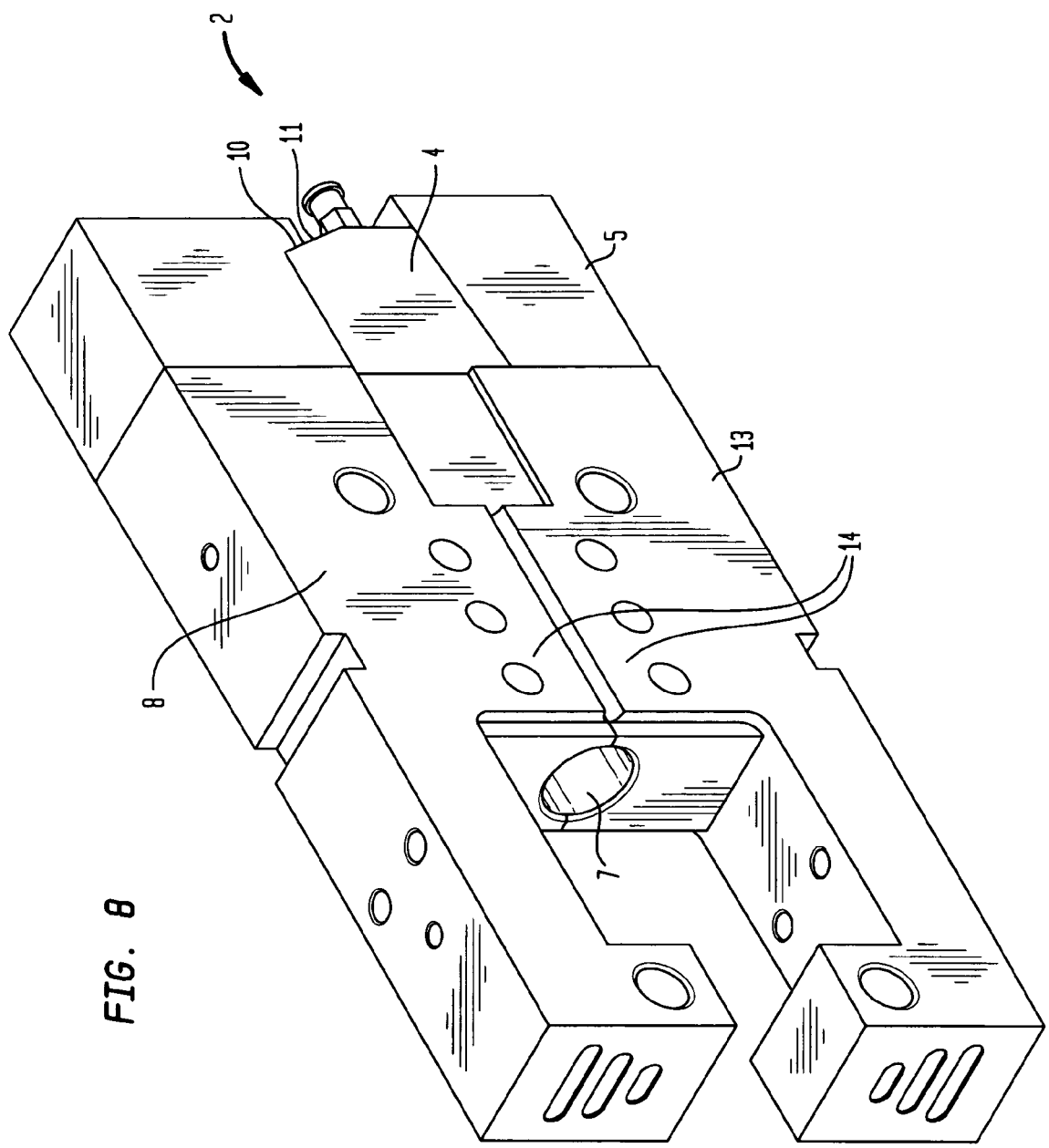
Figure 9:
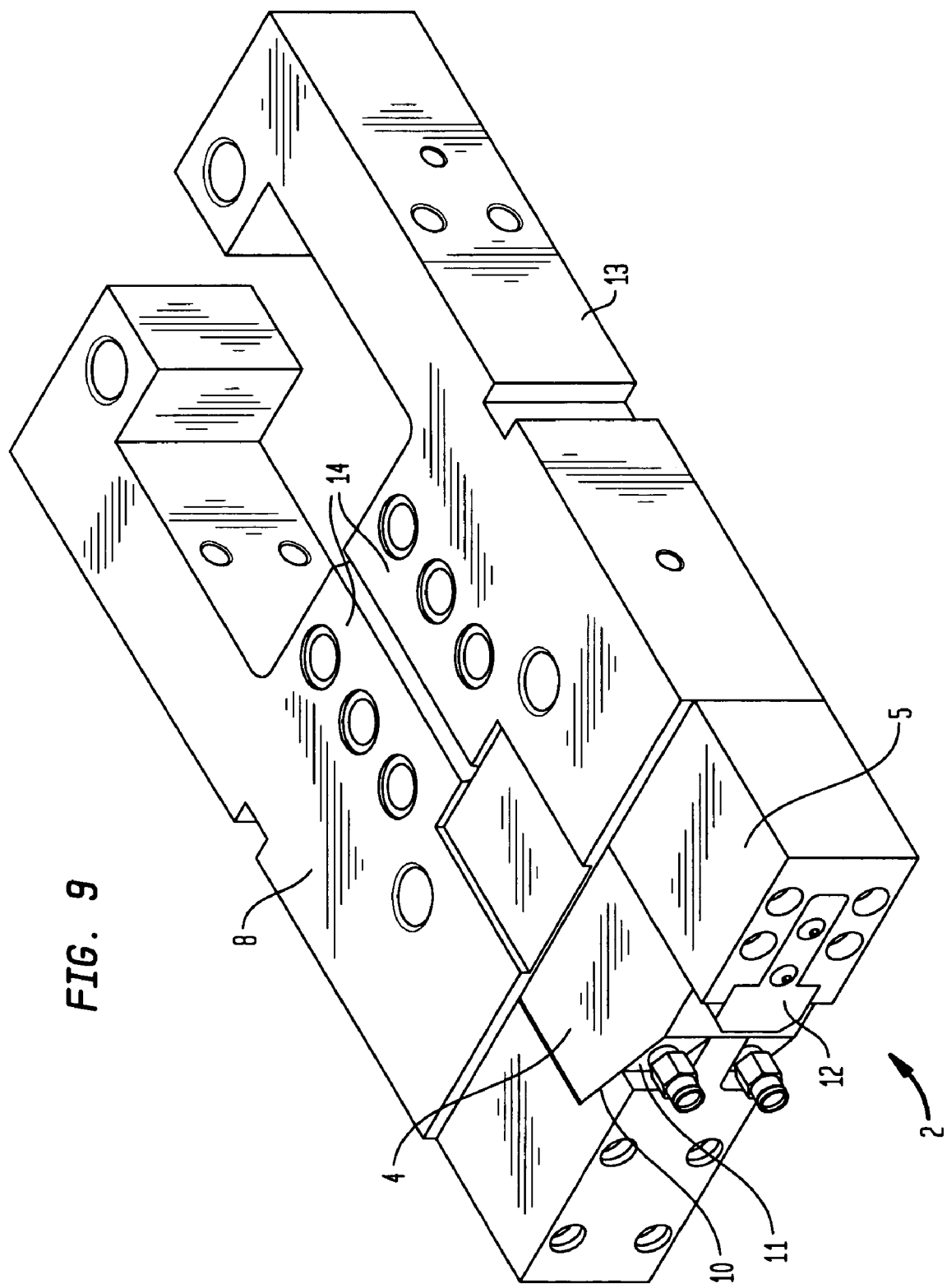
Figure 10:
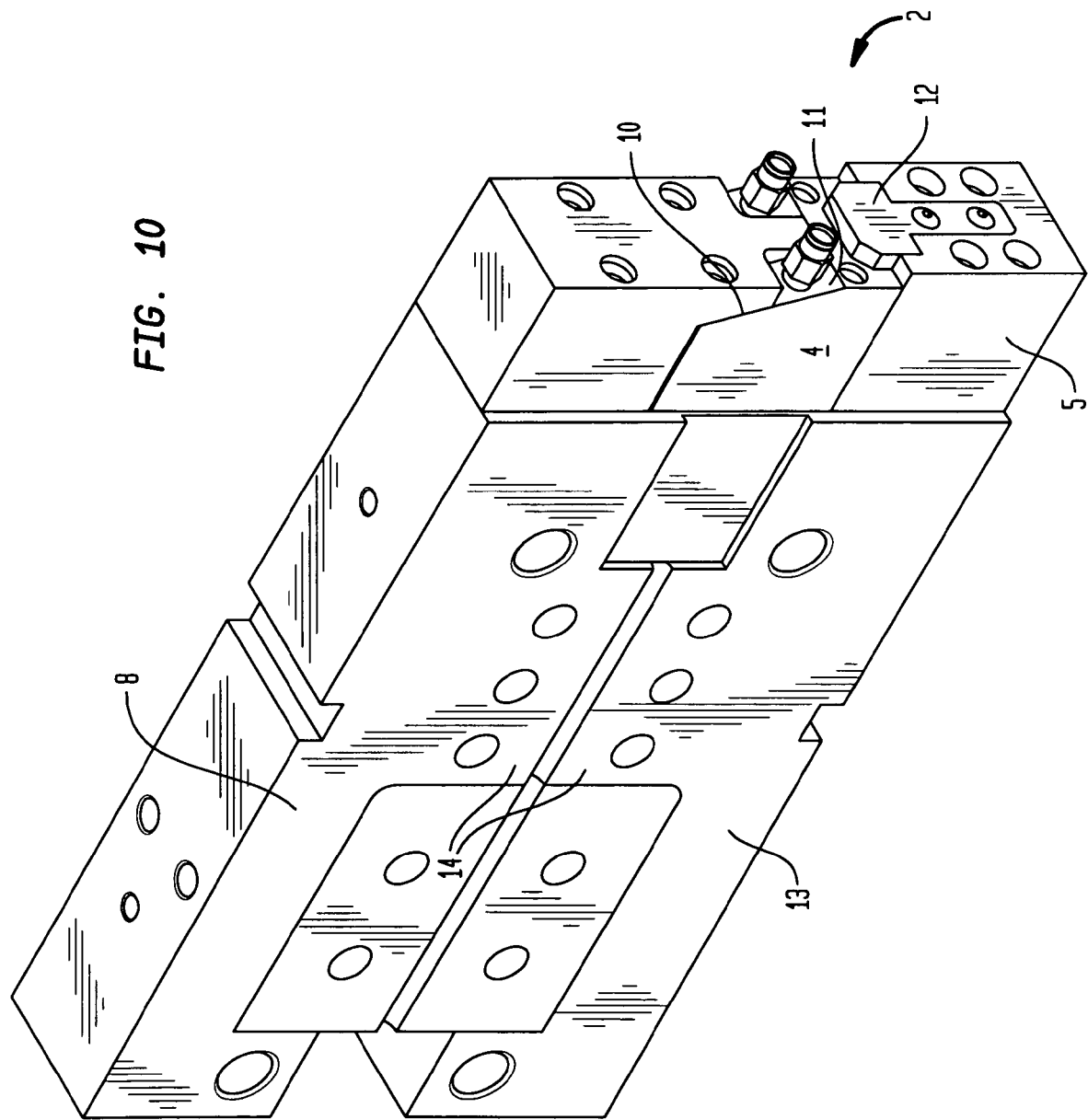
Figure 11:
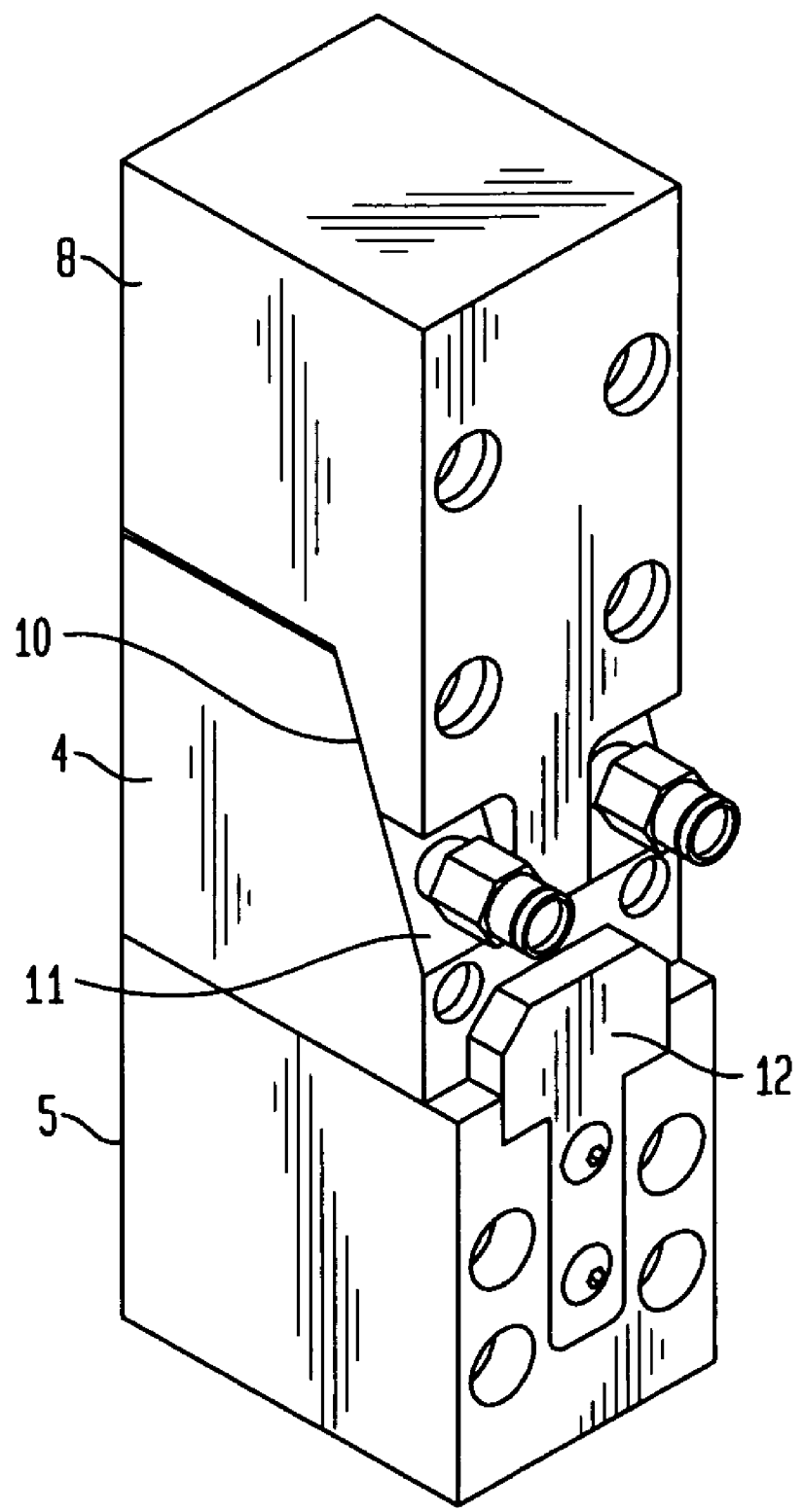

As best shown in FIG. 2, bottom plug assembly 2 may be slideably engaged with wedge base 5 through a slide mechanism 6 having a male part and a female part. The slide mechanism 6 may be a dove-tailed slide. Although the embodiment of FIG. 2 is shown with the female part of sliding mechanism 6 attached to bottom plug assembly 2 and the male part attached to wedge base 5, it is to be understood that this configuration could be reversed, with the female part attached to wedge base 5 and the male part attached to bottom plug assembly 2. Furthermore, although the sliding mechanism 6 is shown in FIG. 2 to be a dove-tailed slide, any type of sliding mechanism that will perform an equivalent function is contemplated as part of the present embodiments. As mentioned above, sliding mechanism 6 may preferably be angled at an angle of 5 degrees relative to the parting plane. The angled orientation of the sliding mechanism may serve to extend the life of bottom plug assembly 2 and reduce maintenance costs. This is because as top die set 8 is lowered, exerting a force on bottom plug assembly 2, a component of that force is directed perpendicular to the parting plane. As the plane along which bottom plug assembly 2 slides is changed relative to the parting plane, the effective angle of the perpendicular force exerted by the top die set is reduced. Consequently, the force acting on the bearing surfaces of the slide mechanism 6 is reduced, thereby lessening wear on those surfaces. Also shown in FIG. 2 is end stop 12. End stop 12 may be configured to be mounted to the back of wedge base 5 (shown in FIG. 6) and serves to stop retraction of bottom plug assembly 2 from extending beyond the back of wedge base 5.

Figure 3:
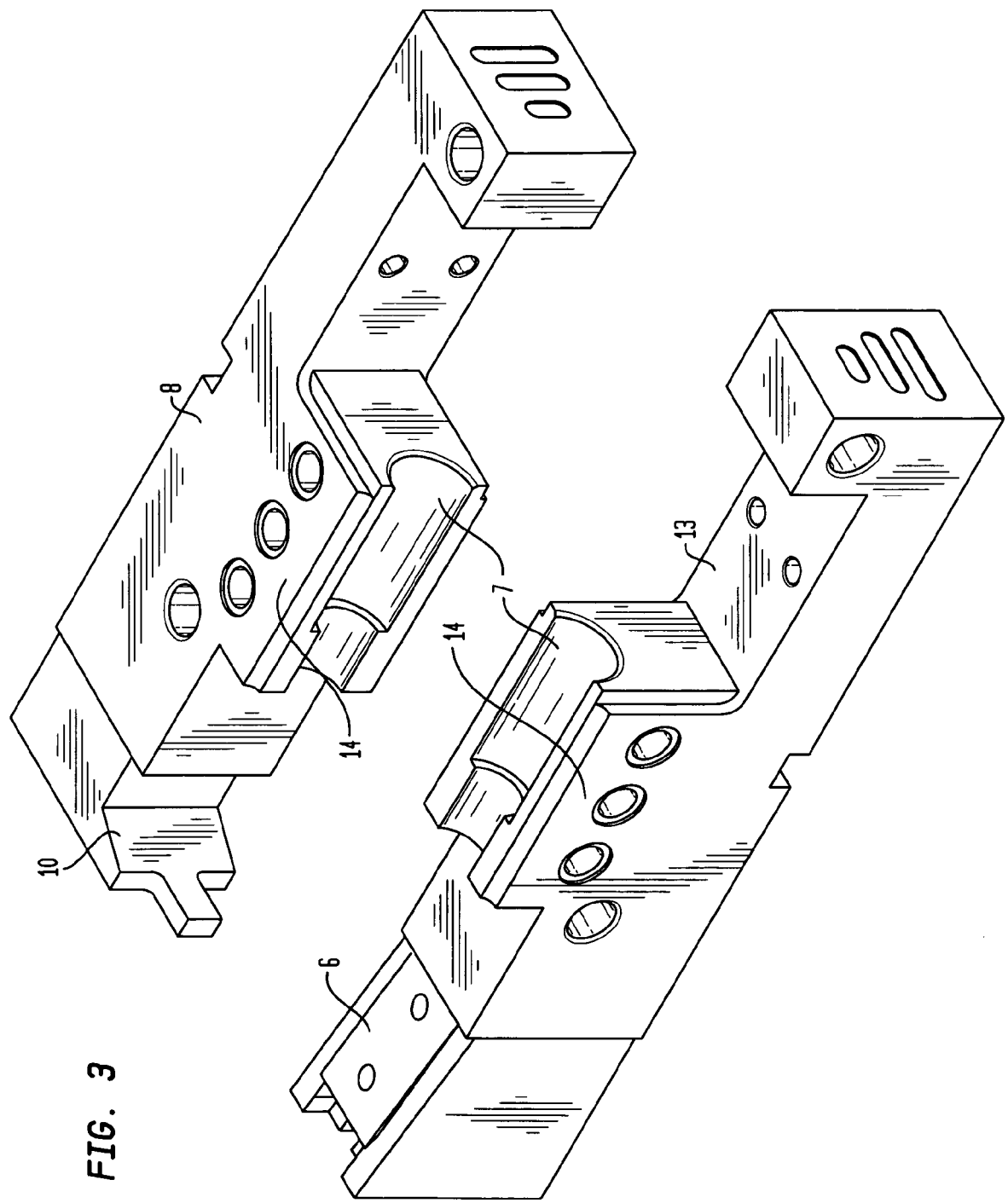
FIG. 3 is an isometric view of a top die set and corresponding bottom die set wherein the portions that form the blow mold cavity can be clearly seen.

Referring to FIG. 3, there is shown top die set 8 and bottom die set 13. Bottom die set 13 may be mounted to a machine bed and may remain stationary throughout the blow molding process. Top die set 8 may be configured to reciprocate up and down between a raised position and a lowered position. Blow mold halves 14 are mounted on top and bottom die sets 8 and 13 respectively and may be configured to mate together when top die set 8 is in a lowered position. When mated together, the blow mold cavities 7 of mold halves 14 combine with the bottom plug to define the form a plastic container will take during the blow molding process.

Figure 4:
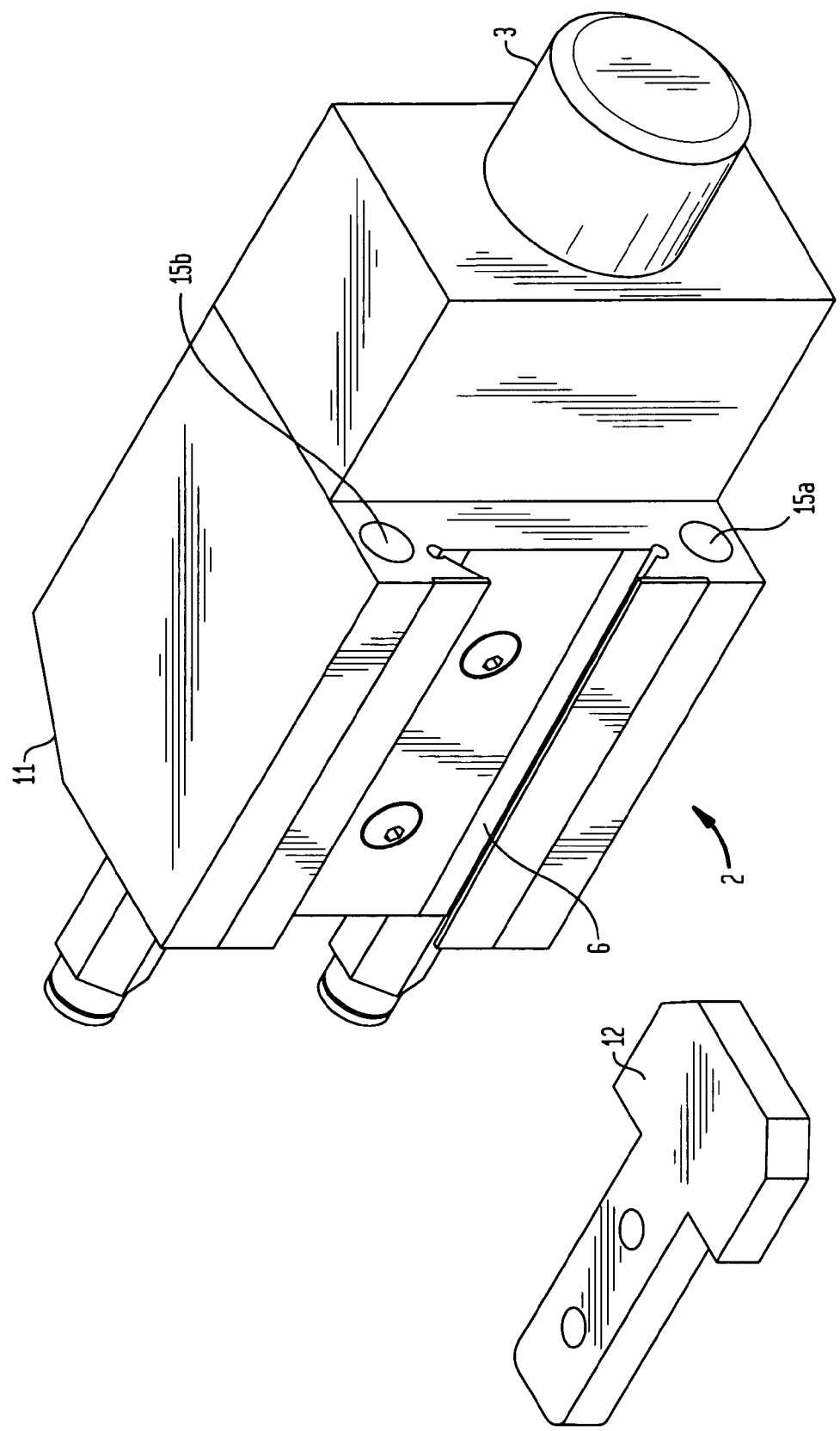
FIG. 4 is an isometric view of a bottom plug assembly of an embodiment.

FIG. 4 shows an isometric view of a bottom plug assembly 2 of an embodiment of the present invention with the female portion of slide mechanism 6 attached thereto. The female portion of slide mechanism 6 may be attached to bottom plug assembly 2 by means of fasteners, thereby allowing for easy removal and replacement of the portion if necessary. Such easy removal and replacement is cost-effective and desirable because no machining is needed to maintain or repair the assembly. In one preferred embodiment, the female portion of slide mechanism 6 may be made from self-lubricating metal, such as alumina-bronze. The male portion may be constructed of a harder material, such as hardened steel. Alternatively, the selection of materials could be reversed between the male and the female components of slide mechanism 6 in which case the male component of slide mechanism 6 would be releasably attached to wedge base 5 with fasteners. Moreover, it is noted that the slide mechanism of the embodiments is not limited to a self-lubricating metal and a relatively harder material. Upon viewing this disclosure, one skilled in the art of the embodiments will readily appreciate the wide range of suitable materials for the slide mechanism.

Figure 12:
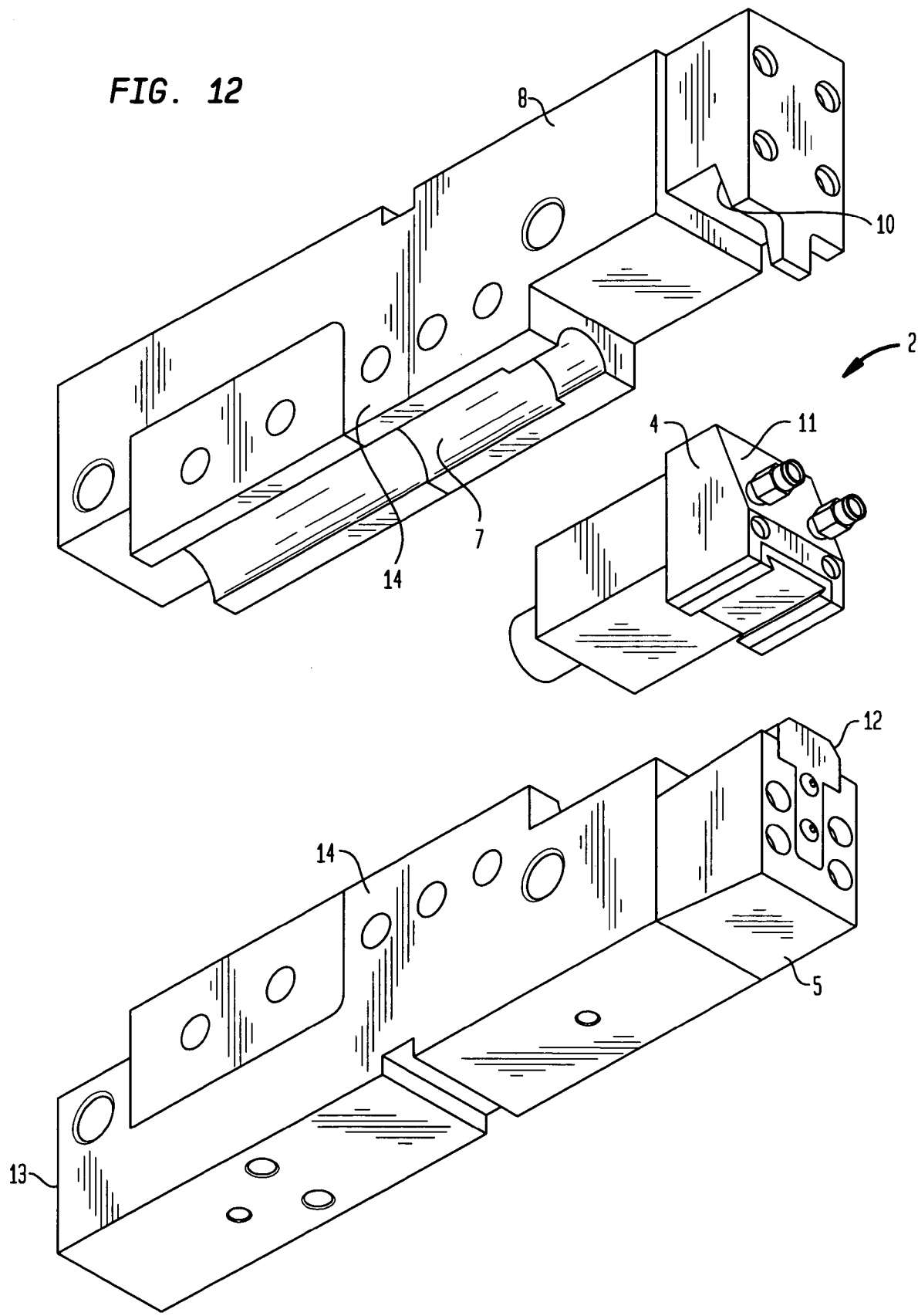
FIG. 12 is an exploded perspective view of the blow mold and bottom plug of an embodiment.

FIGS. 5-11 show various perspective views of the blow mold having the bottom plug assembly 2 disposed therein and top die set 8 in the lowered position. FIG. 12 shows an exploded view of an embodiment. Referring to FIG. 12, end stop 12 is shown secured to the back of wedge base 5. End stop 12 may be releasably secured to wedge base 5 through the use of fasteners to allow for easy disassembly of the blow mold and easy removal of bottom plug assembly 2. Such easy disassembly may be desirable for purposes of cleaning or maintaining the blow mold or bottom plug assembly components such as for purposes of replacing a portion of slide mechanism 6.

Figure 14:
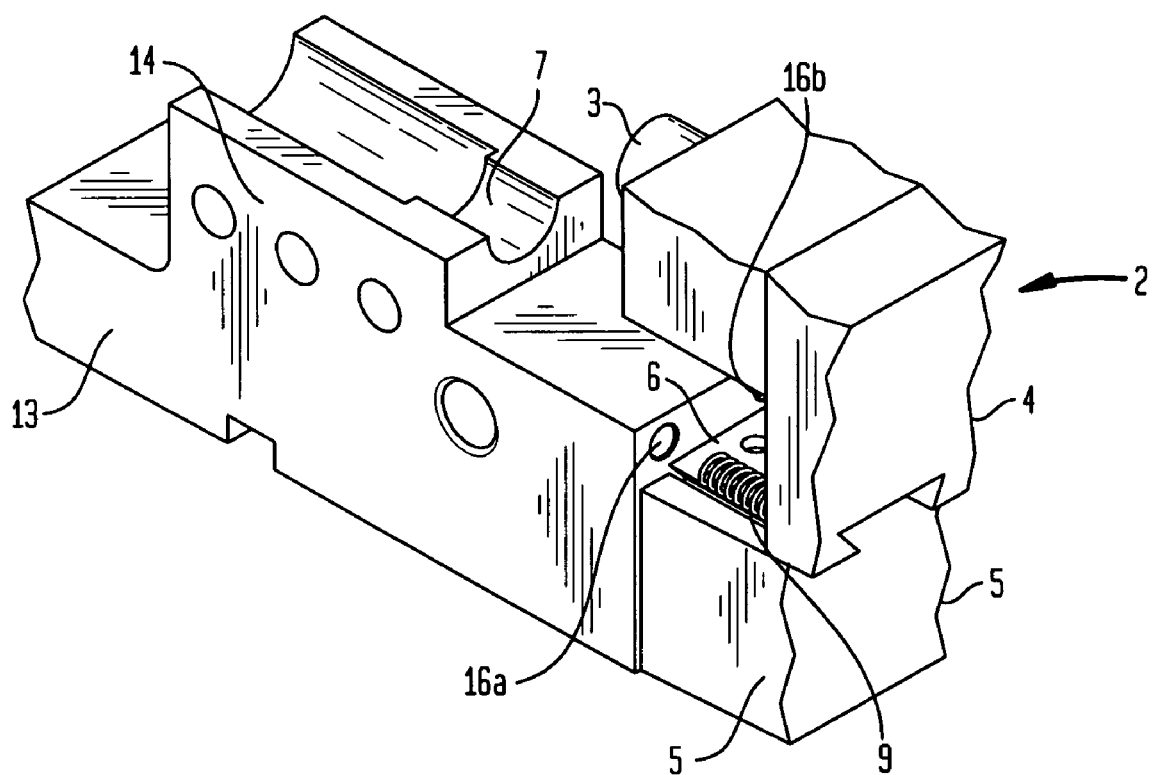
Figure 15:
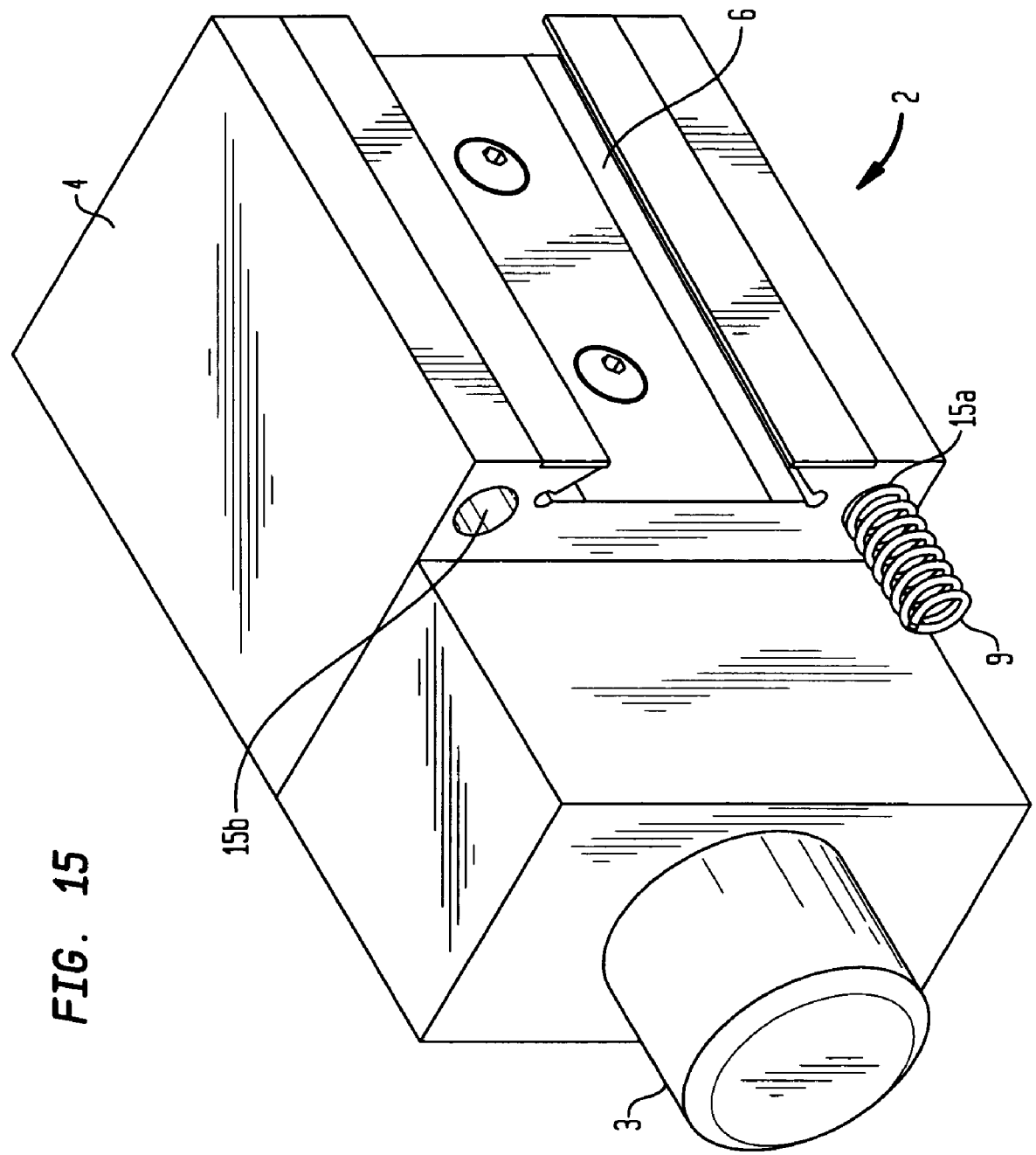
Figure 16:
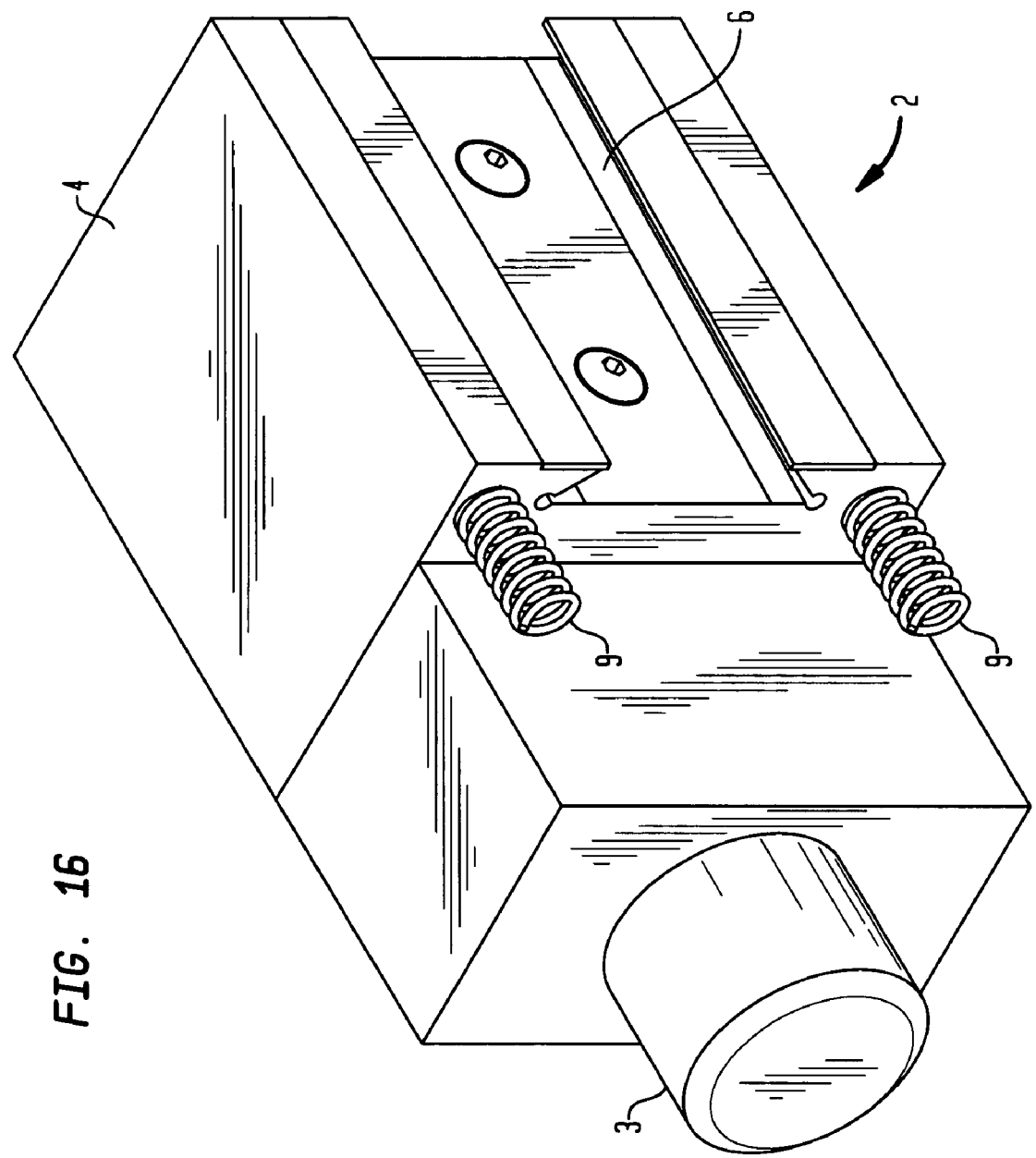

Referring to FIGS. 13-16, there is shown an embodiment including bottom plug assembly 2, bottom die set 13, and biased springs 9. As best shown in FIG. 15, biased springs 9 may be positioned with one end engaging holes 15a, 15b in bottom plug assembly 2, and the other end engaging holes 16a, 16b in bottom die set 13 (as shown in FIG. 14). Biased springs 9 may preferably be configured to exert a force on bottom plug assembly 2 away from bottom die set 13 in order to push bottom plug assembly 2 away from bottom die set 13 along slide mechanism 6 and into a retracted position when top die set 8 is in a raised position. Biased springs 9 are preferably pliant enough to be compressed by top die set 8 when the bottom plug 3 is urged into mold cavity 7 through the lowering of top die set 8.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention.

The invention claimed is:

1. A bottom plug retract mechanism for use in a blow mold having a top die and a bottom die defining at least a portion of a mold cavity, the mechanism comprising:
    a plug that intersects the parting plane when the mold cavity is closed, that is parallel to the parting plane when the mold cavity is closed, and that is operable to move away from the mold cavity at a non-zero angle to the parting plane when the mold cavity is opened.

2. The bottom plug retract mechanism of claim 1, wherein the angle at which the plug moves away from the mold cavity is about 5 degrees.

3. A bottom plug retract mechanism for injection blow molding comprising:
    a plug portion configured to align with a mold cavity during a blow molding operation;
    a wedge portion having a first end, a second end opposite the first end, a top, and a bottom, wherein the first end is attached to the plug portion and defines at least one recess;
    a slide mechanism having a first portion and a second portion, wherein either the first portion or the second portion is attached to the bottom of the wedge portion and the other of the first or the second portion is configured to slideably engage therewith, and wherein the slide mechanism is oriented at an angle relative to the parting plane of the mold cavity; and
    at least one biased retractor mechanism operatively engaged with the at least one recess and configured to provide a force on the bottom plug retract mechanism away from the mold cavity, wherein the bottom plug retract mechanism moves away from the mold cavity along a path determined by the slide mechanism.

4. The bottom plug retract mechanism of claim 3, wherein the path along which the bottom plug retract mechanism moves is arranged so that when the bottom plug retract mechanism is remote from the mold cavity, there is a gap between surfaces of the plug and surfaces defining the mold cavity.

5. The bottom plug retract mechanism of claim 4, wherein the gap between the surfaces of the plug and the surfaces of the mold cavity is large enough to prevent contact therebetween, but small enough to prevent the entry of foreign objects therein.

6. The bottom plug retract mechanism of claim 3, wherein the angle of the slide mechanism relative to the parting plane of the mold cavity is about 5 degrees.

7. The bottom plug retract mechanism of claim 3, wherein the at least one biased retractor mechanism includes at least one spring.

8. The bottom plug retract mechanism of claim 3, wherein the slide mechanism is a dove-tailed slide.

9. The bottom plug retract mechanism of claim 3, wherein the first portion of the slide mechanism is a female portion and the second portion of the slide mechanism is a male portion.

10. The bottom plug retract mechanism of claim 3, further comprising an end stop arranged to engage the second end of the wedge portion, thereby limiting movement thereof away from the mold cavity when the wedge portion is in a retracted position.

11. The bottom plug retract mechanism of claim 3, further comprising upper and lower mold halves, wherein the first or second portion of the slide mechanism is attached to the lower mold half.

12. The bottom plug retract mechanism of claim 11, wherein the first and second portions of the slide mechanism are releasably attached to the wedge portion and the lower mold half of the bottom plug retract mechanism with fasteners.

13. The bottom plug retract mechanism of claim 3, wherein the first portion of the slide mechanism is composed of a self-lubricating metal, such as alumina-bronze, and the second portion of the slide mechanism is composed of a harder material, such as hardened steel.

14. The bottom plug retract mechanism of claim 11, wherein a part of the second end of the wedge portion is angled forward toward the first end thereof and a surface of the upper mold half is configured to engage the angled part of the second end of the wedge portion such that when the upper mold half is lowered against the wedge portion, the wedge portion is advanced toward the mold cavity.

15. A method of introducing and retracting a plug from a blow mold cavity using the bottom plug retract mechanism of claim 3, the method comprising:

contacting a bottom plug retract mechanism with an upper mold half, the upper mold half configured to push the bottom plug retract mechanism in a generally forward and downward direction as dictated by the orientation of a slide mechanism;

lowering the upper mold half until it engages a lower mold half, with the plug portion of the bottom plug retract mechanism positioned in the mold cavity;

raising the upper mold half to release the downward and forward forces acting on bottom plug retract mechanism, thereby allowing the biased retractor means to push the bottom plug retract mechanism upward and backward from the mold cavity, thereby removing the plug from the mold cavity without wearing the surfaces of the plug or the cavity.

* * * * *